March 14, 1967 R. C. DINSMORE 3,308,899
POSTAL WEIGH SCALE USING OPPOSED MAGNETS
Filed July 8, 1966

INVENTOR
ROBERT C. DINSMORE
BY
Barnes, Kisselle, Raisch & Choate
ATTORNEYS

United States Patent Office 3,308,899
Patented Mar. 14, 1967

3,308,899
POSTAL WEIGH SCALE USING OPPOSED MAGNETS
Robert C. Dinsmore, Flint, Mich., assignor to Dinsmore Instrument Company, Detroit, Mich., a corporation of Michigan
Filed July 8, 1966, Ser. No. 563,879
3 Claims. (Cl. 177—201)

This invention relates to a postal scale and more particularly to a type of inexpensive device which can be used as a premium or advertising device which yet has a practical application.

It is an object of the present invention to provide a device which utilizes the repelling characteristic of similar poles of magnets to serve as a weight resisting mechanism and being a proper scale so that postage up to a certain weight, depending on the calibration of the device, can be weighed.

It is a further object to provide such a device in a very inexpensive form wherein one of the magnetic elements serves as a weighing platform to permit the basic cost to be extremely low.

Another object is a structure which utilizes the mutual repelling characteristic of similar magnetic poles to create a floating action to permit a simple supporting shaft to float in the apertured base to support the weighing platform.

Other objects and features of the invention relating to details of construction and operation will be apparent in the following description and claims.

Figure 1:
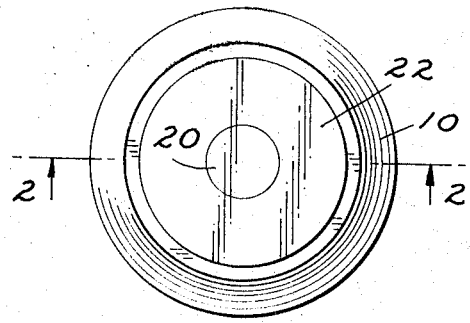

Drawings accompany the disclosure and the various views thereof may be briefly described as:

FIGURE 1, a top view of the device.

Figure 2:
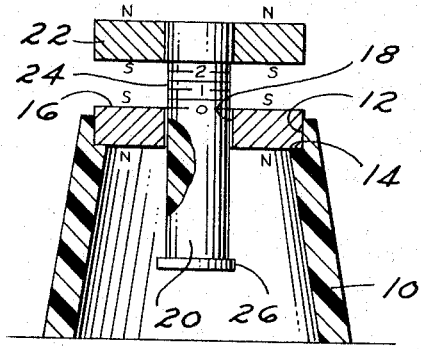

FIGURE 2, a sectional view on line 2—2 of FIGURE 1.

Figure 3:
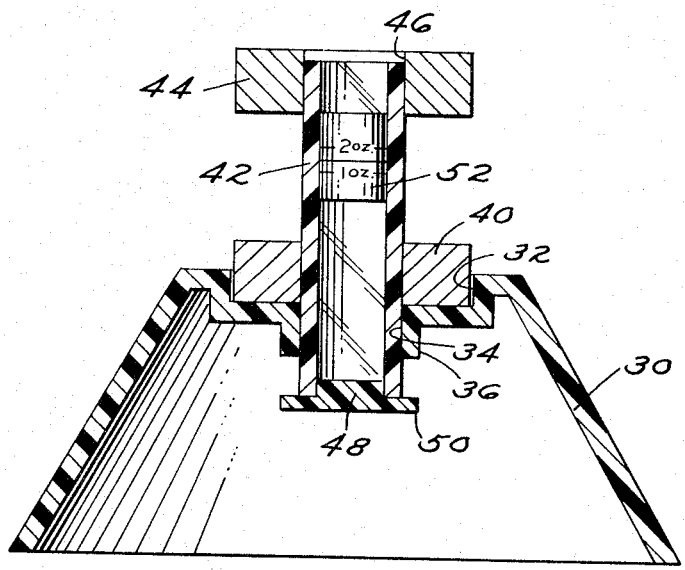

FIGURE 3, a sectional view of a modified form of the device.

Referring to the drawings: In FIGURE 2, a sectional view of the device illustrates a hollow, conical base 10 preferably formed of material such as plastic having at its smaller end a recess 12 with a supporting shoulder 14. In this recess is a pellet of molded magnetic material 16 having a central passage 18. This material can be one of a number of types of permanent magnet material either cast or preferably molded from powdered ferrites.

Extending through the passage 18 is a shaft 20 having at its top end a similar insert of magnetic material 22 mounted securely at the top of the shaft to serve as a supporting platform. The neck portion 24 of the shaft is calibrated and the magnets are so positioned that there is similar polarity of the two parts as they face each other. Thus, they tend to repel each other. The shaft 20, which has a loose sliding fit in the passage 18, is guided in the walls of the opening. The devices are retained together by a small flange 26 which is suitably applied to or formed on the shaft 20.

It will be readily understood that the magnets may be calibrated to support letter weights of 1, 2 or 3 ounces, etc. before the magnets are pressed together by the weight. The supporting platform for the mail to be weighed is formed by the top surface of the magnet 22.

In FIGURE 3, a modified form of the device is shown wherein a base 30 is formed with a cylindrical recess 32 at the top portion thereof, the base of the recess having an opening 34 surrounded by a depending guide flange 36. A lower magnet insert 40 is secured in the recess 32 either by a frictional engagement with the walls of the recess or with suitable adhesive and has a central passage aligned with the opening 34 to lengthen the guide walls for the platform shaft.

The upper portion of the scale device is formed by a shaft in the form of a hollow and preferably transparent plastic tube 42 which receives the upper magnet element 44 in a frictional engagement with a central hole 46 in the magnet. The lower end of the tube 42 may be plugged by a small cap 48 which has a flange 50 which serves as a retaining flange to keep the parts assembled. The device can be readily graduated by inserting a tubular piece of sheet material 52 in the interior of the tube, the sheet being graduated on the outer surface so that the indicia thereon may be read from outside the tube. The device can be calibrated by adjusting the position of the tubular sheet material 52 to a proper position in the tube 42 and then locating it with a spot of adhesive or any other desirable means.

The mutually repellent fields of the opposed magnets keeps the upper magnet floating in relation to the base in the guide passage so that there is a free action of the scale at all times. The magnets can be so calibrated that bottoming of the scale can indicate weight over a predetermined amount.

What is claimed as new is as follows:

1. A device for serving as a scale which comprises a base having a top portion for mounting an insert, a first insert of magnetic material on said top portion, said insert on said base having an axial passage, a shaft slidingly received in said passage, and a platform including a second insert of magnetic material on the top of said shaft having a polar disposition wherein similar poles of said inserts are facing each other, whereby the magnetic repelling action of said inserts serves as a variable resistance increasing with the proximity of said magnets to serve as a scale for a weighing device for articles placed on the platform.

2. A device as defined in claim 1 in which the base comprises a truncated, conical, molded shell and an integral top face having a recess for receiving the first magnetic insert in the top face thereof and having a central depending flange surrounding an axial opening in the bottom of said recess in registry with the passage in said first insert to serve as a guide, said shaft comprising a hollow tube passing through said axial passage and said central opening to serve as a vertical slip shaft in said passage and opening, said platform being mounted on the top of said tube.

3. A device as defined in claim 2 in which said tube is of transparent material, and a visible indicia sheet within said tube is located according to the calibration of the opposing magnets to register weight on said platform.

References Cited by the Examiner
UNITED STATES PATENTS

| 2,148,523 | 2/1939 | Baermann | 177—201 |
| 3,123,165 | 3/1964 | Carson et al. | 177—185 X |
| 3,195,663 | 7/1965 | Thompson | 177—201 |

FOREIGN PATENTS

| 692,593 | 6/1940 | Germany. |

RICHARD B. WILKINSON, Primary Examiner.

R. S. WARD, Jr., Assistant Examiner.